United States Patent
Kodialam et al.

(10) Patent No.: US 9,392,347 B1
(45) Date of Patent: Jul. 12, 2016

(54) JOINT SIGNAL-ROUTING AND POWER-CONTROL FOR AN OPTICAL NETWORK

(71) Applicant: Alcatel-Lucent USA Inc., Murray Hill, NJ (US)

(72) Inventors: Muralidharan Kodialam, Marlboro, NJ (US); Rene-Jean Essiambre, Red Bank, NJ (US); Paul Claisse, Skillman, NJ (US); Tirunell V. Lakshman, Marlboro, NJ (US); Zizhong Cao, Miller Place, NY (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/626,550

(22) Filed: Feb. 19, 2015

Related U.S. Application Data

(60) Provisional application No. 62/106,419, filed on Jan. 22, 2015.

(51) Int. Cl.
  *H04J 14/00* (2006.01)
  *H04Q 11/00* (2006.01)
  *H04J 14/02* (2006.01)

(52) U.S. Cl.
  CPC ......... *H04Q 11/0005* (2013.01); *H04J 14/0227* (2013.01); *H04Q 11/0062* (2013.01); *H04Q 11/0066* (2013.01)

(58) Field of Classification Search
  CPC .......... H04Q 11/0005; H04Q 11/0001; H04Q 11/0062; H04Q 11/0071; H04Q 2011/0013; H04Q 2011/0024; H04Q 2011/0032; H04Q 2011/0033; H04Q 2011/0052; H04Q 2011/0054; H04Q 2011/0073; H04Q 11/0066; H04J 14/0227; H04J 14/0284

USPC .......................................... 398/57, 49, 58, 26
See application file for complete search history.

(56) References Cited

U.S. PATENT DOCUMENTS

| | | | | |
|---|---|---|---|---|
| 7,634,167 | B2* | 12/2009 | Bruno | H04J 14/0227 385/147 |
| 8,666,244 | B2* | 3/2014 | Bruno | H04B 10/07953 398/26 |
| 8,909,041 | B2* | 12/2014 | Ye | H04B 10/07953 398/147 |
| 2014/0334815 | A1* | 11/2014 | Grellier | H04J 14/0227 398/27 |
| 2015/0304035 | A1* | 10/2015 | Nijhof | H04J 14/0221 398/26 |

OTHER PUBLICATIONS

Mecozzi, Antonio, "On the Optimization of the Gain Distribution of Transmission Lines with Unequal Amplifier Spacing," IEEE Photonics Technology Letters, vol. 10, No. 7, 1998, pp. 1033-1035.

Hassin, R. "Approximation schemes for the restricted shortest path problem," Mathematics of Operation Research, 1992, vol. 17, No. 1, pp. 36-42.

* cited by examiner

*Primary Examiner* — M. R. Sedighian
(74) *Attorney, Agent, or Firm* — Mendelsohn Dunleavy, P.C.; Yuri Gruzdkov

(57) ABSTRACT

We disclose a signal-routing method directed at improving the throughput of an optical network by taking into account the fiber nonlinearity in the process of solving a joint signal-routing and power-control problem for the optical network. Based on the obtained solution, a network controller may set the signal-routing configurations of the various network nodes and the optical gains of the various optical amplifiers to enable the optical network to carry the traffic in a manner that results in a higher throughput than that achievable with the use of conventional signal-routing and/or power-control methods.

20 Claims, 7 Drawing Sheets

100

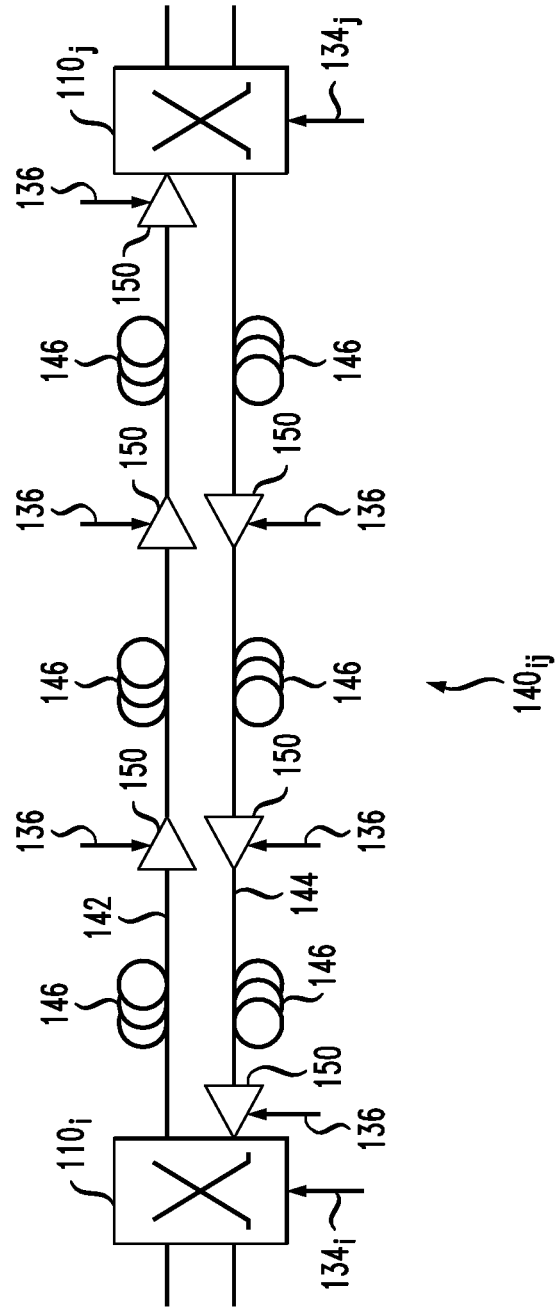

JOINT SIGNAL-ROUTING AND POWER-CONTROL FOR AN OPTICAL NETWORK

CROSS-REFERENCE TO RELATED APPLICATIONS

This application claims priority from U.S. Provisional Patent Application No. 62/106,419 filed on Jan. 22, 2015, and entitled "JOINT ROUTING AND POWER-CONTROL FOR AN OPTICAL NETWORK," which provisional patent application is incorporated herein by reference in its entirety.

BACKGROUND

1. Field

The present disclosure relates to optical communication equipment and, more specifically but not exclusively, to routing optical signals in an optical network.

2. Description of the Related Art

This section introduces aspects that may help facilitate a better understanding of the disclosure. Accordingly, the statements of this section are to be read in this light and are not to be understood as admissions about what is in the prior art or what is not in the prior art.

The physical layer of an optical network typically suffers from various linear and nonlinear impairments, such as power loss, dispersion, crosstalk, cross-phase modulation, four-wave mixing, etc. The adverse effects of these impairments are especially pronounced in optically transparent and optically translucent networks that are typically configured to keep the communication signal in the optical domain as long as possible and/or employ optical-to-electrical-to-optical signal regeneration very sparsely. However, signal-routing methods that are directed at improving the network efficiency by taking into account the physical-layer impairments are not sufficiently developed yet.

SUMMARY OF SOME SPECIFIC EMBODIMENTS

Disclosed herein are various embodiments of a signal-routing method directed at improving (e.g., optimizing) the throughput of an optical network by taking into account the fiber nonlinearity in the process of solving a joint signal-routing and power-control problem for the optical network. Based on the obtained solution, a network controller may set the signal-routing configurations of the various network nodes and the optical gains of the various optical amplifiers to enable the optical network to carry the traffic in a manner that results in a higher throughput than that achievable with the use of conventional signal-routing and/or power-control methods.

According to one embodiment, provided is an optical communication method comprising the steps of: determining a plurality of optical paths for a traffic matrix to be routed through an optical network, wherein each optical path of the plurality satisfies a feasibility condition defined by a first threshold value and a second threshold value, the first threshold value being configured to specify an optical signal-to-noise ratio, and the second threshold value being configured to specify an optical nonlinearity threshold; determining a universal set of powers, each power in said set corresponding to a respective span in the plurality of optical paths and representing an optical power level in that respective span, with each power in said set being determined based on the first and second threshold values; and routing the traffic matrix through a subset of the plurality of optical paths.

According to another embodiment, provided is a non-transitory machine-readable medium, having encoded thereon program code, wherein, when the program code is executed by a machine, the machine implements a computer-aided signal-routing method, the computer-aided signal-routing method comprising the steps of: determining a plurality of optical paths for a traffic matrix to be routed through an optical network, wherein each optical path of the plurality satisfies a feasibility condition defined by a first threshold value and a second threshold value, the first threshold value being configured to specify an optical signal-to-noise ratio, and the second threshold value being configured to specify an optical nonlinearity threshold; determining a universal set of powers, each power in said set corresponding to a respective span in the plurality of optical paths and representing an optical power level in that respective span, with each power in said set being determined based on the first and second threshold values; and routing the traffic matrix through a subset of the plurality of optical paths.

According to yet another embodiment, provided is an optical network comprising: a plurality of network nodes optically interconnected by a plurality of optical links, each comprising one or more fiber spans; and a network controller operatively coupled to the plurality of network nodes and configured to: determine a plurality of optical paths for a traffic matrix to be routed through the plurality of optical links, wherein each optical path of the plurality of optical paths satisfies a feasibility condition defined by a first threshold value and a second threshold value, the first threshold value being configured to specify an optical signal-to-noise ratio, and the second threshold value being configured to specify an optical nonlinearity threshold; a universal set of powers, each power in said set corresponding to a respective span in the plurality of optical paths and representing an optical power level in that respective span, with each power in said set being determined based on the first and second threshold values; and route the traffic matrix through a subset of the plurality of optical paths.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 1A-1B show block diagrams of an optical network in which various embodiments may be practiced;

DETAILED DESCRIPTION

Figure 1A:
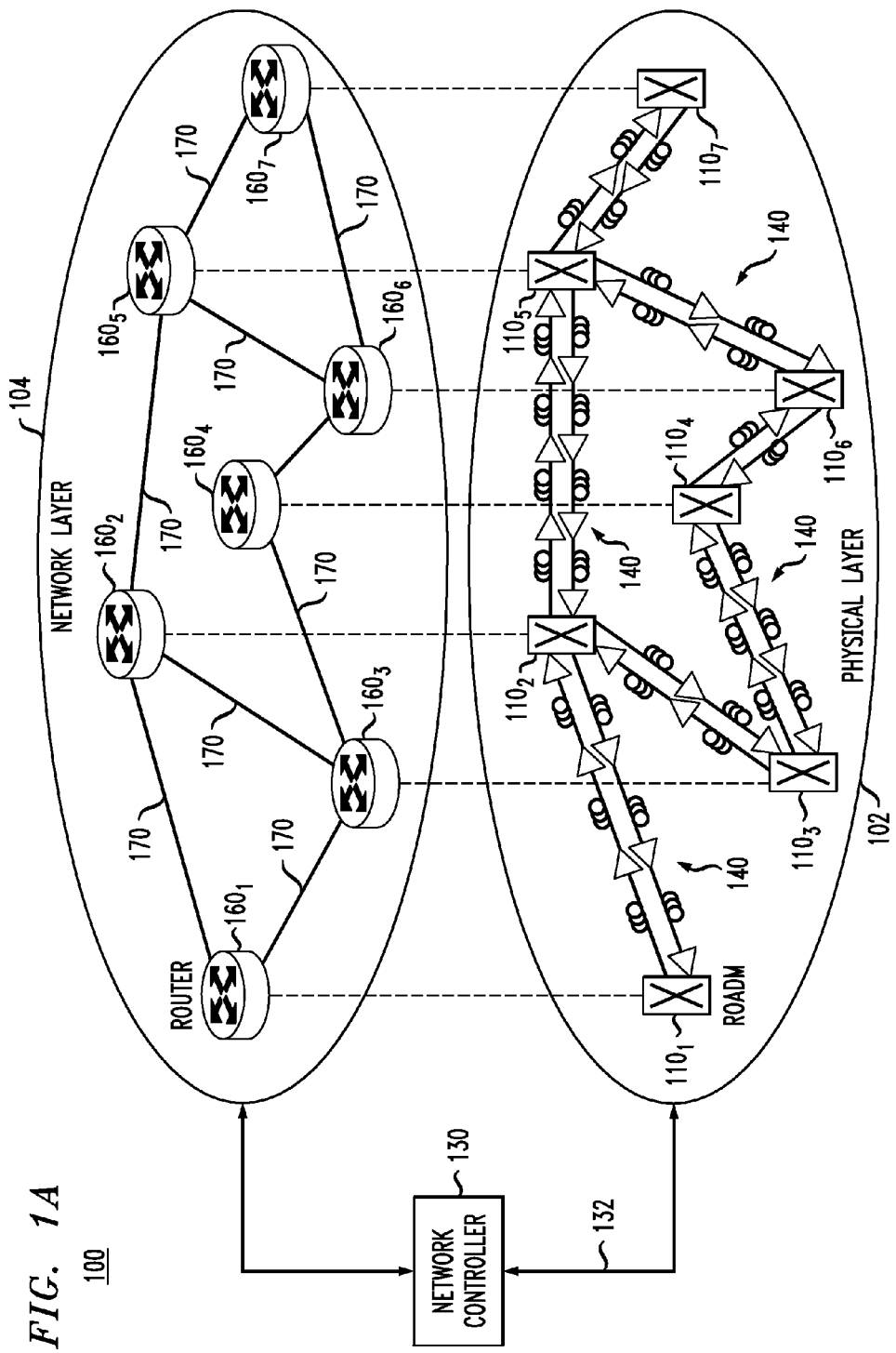

FIGS. 1A-1B show block diagrams of an optical network 100 in which various embodiments may be practiced. More specifically, FIG. 1A shows an overall schematic view of network 100 showing its physical and network layers corresponding to the Open System Interconnection (OSI) model. FIG. 1B shows a block diagram of an optical link 140 between two nodes 110 in network 100.

A physical layer 102 of network 100 is illustratively shown in FIG. 1A as comprising seven nodes $110_1$-$110_7$ interconnected by a plurality of optical links 140. In various alternative embodiments, the number of nodes 110 in network 100 may be different from seven. In an example embodiment, a node 110 may be implemented using a reconfigurable optical add/drop multiplexer (ROADM).

An optical link 140, shown in FIG. 1B, is configured to connect nodes $110_i$ and $110_j$, where i,j=1, 2, ..., 7 and i≠j. For illustration purposes, optical link $140_{ij}$ is shown as being a bidirectional link having two unidirectional sub-links 142 and 144. Sub-link 142 is configured to transport optical signals from node $110_i$ to node $110_j$. Sub-link 144 is similarly configured to transport optical signals from node $110_j$ to node $110_i$. In an example embodiment, each of sub-links 142 and 144 comprises a plurality of fiber spans 146 and a plurality of tunable optical amplifiers 150. In some embodiments, some optical links 140 in network 100 may be unidirectional links.

A network controller 130 operates to control the routing configurations of the various nodes 110 and the optical gains of the various optical amplifiers 150 using a plurality of control paths 132. A plurality of control signals 134 (see FIG. 1B) transmitted via control paths 132 are used to control (e.g., set, change, etc.) the signal-routing configurations of nodes 110. A plurality of control signals 136 (also see FIG. 1B) transmitted via control paths 132 are similarly used to control the optical gains of optical amplifiers 150.

Routing decisions in network 100 may be made using a routing protocol corresponding to a network layer 104, wherein each node $110_i$ is represented by a corresponding router $160_i$. Routers 160 are interconnected by a plurality of virtual links 170. Note that a virtual link 170 may or may not have a one-to-one correspondence to one of optical links 140 in physical layer 102. In the latter case, a single virtual link 170 may be mapped onto two or more optical links 140.

In some embodiments, noise and nonlinearity may be the two main factors that contribute to the degradation of optical signals in network 100. A respective subset of amplifiers 150 can be configured to ensure that the optical signal-to-noise ratio (OSNR) is greater than a minimum threshold that permits proper detection and decoding of an optical signal at a respective end receiver. However, unlike wireless networks, where the signal-to-noise ratio can often be improved by simply increasing the transmit power, in optical networks, such as network 100, an increased transmit power may lead to increased effects of nonlinearity, such as the Kerr nonlinearity. Various embodiments of a signal-routing method disclosed herein are directed at improving (e.g., optimizing) the throughput of network 100 by explicitly taking into account the fiber nonlinearity in the process of solving a joint signal-routing and power-control problem for the network. Based on the obtained solution, controller 130 operates to set the signal-routing configurations of the various nodes 110 and the optical gains of the various optical amplifiers 150 to enable network 100 to carry the traffic in a manner that results in a higher throughput than that achievable with the use of conventional signal-routing and/or power-control methods.

Optical amplifiers 150 operate to boost the optical signal power, with a side effect being that the optical noise is amplified as well. The launch optical power applied to an optical fiber is determined by the output of the optical amplifier 150 located at the end of the preceding fiber span 146 (see FIG. 1B). Since different spans 146 may have different fiber lengths and/or different fiber characteristics, each optical amplifier 150 may be configured to have individual optical-gain settings that are different from the settings of other optical amplifiers 150.

Figure 4:
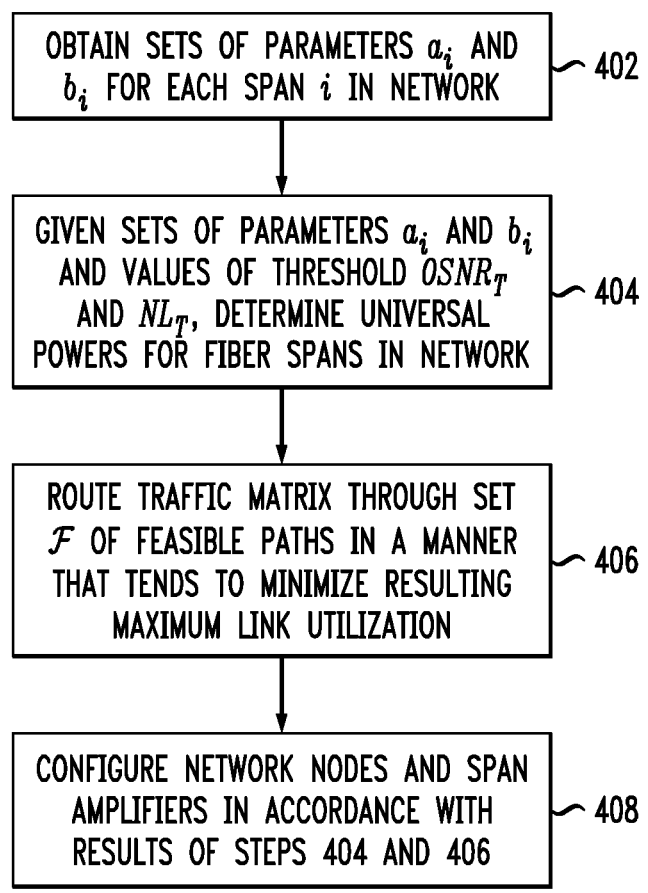
FIG. 4 shows a flowchart of a signal-routing method that can be used in the optical network of FIG. 1 according to an embodiment of the disclosure.

Each fiber span 146 may be configured to carry multiple wavelength-division-multiplexed (WDM) channels, with each WDM channel having allocated thereto a predetermined bandwidth. For simplification purposes, we will assume (without undue limitation) that the launch optical powers for different WDM channels are approximately equal to one another for any given fiber span 146. Hereafter, in the mathematical description that follows, we use index i to designate different fiber spans 146, and use the symbol $P_i$ to designate the launch optical power per WDM channel in fiber span i. In an example embodiment, the value of $P_i$ is determined and set by controller 130, e.g., using method 400 (FIG. 4).

If the modulation and coding schemes are fixed, then the data rate for each channel is also fixed. Since the number of WDM channels on each link 140 is typically known and constant, one can model each link 140 as having a fixed data rate. The data rate for link e in the network is denoted by the symbol $c_e$. In an example embodiment, all fiber spans 146 may have the same capacity (e.g., corresponding to a "100G network"). However, routing methods disclosed herein are also capable of handling a more-general network configuration, wherein different fiber spans are configured to have different capacities.

The traffic that network 100 needs to carry may be specified in the form of a traffic matrix that lists different source-destination pairs and the corresponding traffic demands or volumes. The traffic corresponding to each source-destination pair is hereafter referred to as a respective "commodity." We use index k to designate the different commodities.

Let s(k), t(k), and $d_k$ represent the source node 110, the destination node 110, and the amount of traffic that network 100 needs to carry for commodity k, respectively. Let $Q_k$ represent the set of paths for commodity k. Each path q∈$Q_k$ originates at s(k), terminates at t(k), and comprises a respective plurality of fiber spans 146. The expression i∈q indicates that span i is on path q.

A conventional approach to determining whether or not a traffic matrix can be routed through a non-optical network with given link capacities is to solve a multi-commodity flow problem. However, the situation is significantly more complex for an optical network, such as network 100. For example, in network 100, the set of paths that can be used to route flows depends on the power settings of optical amplifiers 150 at the different fiber spans 146, which is not the case in a non-optical network. As already indicated above, the power setting may be shared by all WDM channels that are being transmitted through that particular optical amplifier 150. The two conditions that a path in network 100 needs to satisfy in order to be feasible can be formulated as follows:

A. the path needs to have a sufficiently large OSNR, e.g., greater than a first specified threshold; and
  B. the nonlinear phase shift (which can be used as a proxy for the amount of degrading interference caused by nonlinear signal distortions) in the path needs to be sufficiently small, e.g., lower than a second specified threshold.

The values of the first and second thresholds may depend on the data rate on each link.

Figure 2:
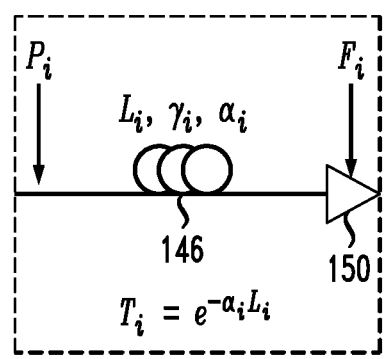
FIG. 2 shows a pictorial view of a fiber span in the optical network of FIG. 1 together with the corresponding span parameters that may be used for routing optical signals through that fiber span according to an embodiment of the disclosure.

FIG. 2 shows a pictorial view of a fiber span 146 and a corresponding optical amplifier 150 (also see FIG. 1B) together with the corresponding span parameters that may be used for routing optical signals through that fiber span according to an embodiment of the disclosure. Assuming that the fiber span shown in FIG. 2 is span i, the following parameters can be used to characterize the span for signal-routing and power-control purposes: (i) the noise figure $F_i$; (ii) the fiber length $L_i$; (iii) the fiber loss coefficient $\alpha_i$; (iv) the transmittance $T_i$; and (v) the nonlinear coefficient $\gamma_i$. As indicated in FIG. 2, the transmittance $T_i$ can be expressed as $T_i = \exp(-\alpha_i L_i)$. The launch power $P_i$ can be adjusted as necessary, e.g., to optimize the operation of network 100.

The launch power $P_i$ determines the OSNR as well as the nonlinear phase shift for span i. The contribution to the overall OSNR from span i considered in isolation is given by Eq. (1):

$$OSNR_i = \frac{T_i P_i}{h\nu B_{ref} F_i} \quad (1)$$

where hv is the energy of one photon of optical frequency v, and $B_{ref}$ is the reference bandwidth (e.g., 12.5 GHz at 1550 nm). Eq. (1) assumes that (i) all parameters are expressed in linear units; (ii) insertion losses between optical amplifier 150 and the fiber of span 146 are small; and (iii) the noise figure $F_i$ is independent of the signal powers at the input and output of the optical amplifier. Note that according to Eq. (1), the OSNR for span i increases with an increase of the launch power $P_i$. Fiber nonlinearity for span i is measured using the nonlinear phase shift $\phi_i$, which is given by Eq. (2):

$$\phi_i = \frac{\gamma_i}{\alpha_i} P_i (1 - T_i) \quad (2)$$

Note that according to Eq. (2), the nonlinear phase shift for span i also increases with an increase of the launch power $P_i$.

Using Eqs. (1) and (2), the above-stated path-feasibility conditions (A) and (B) can be converted into a mathematical form as follows:

$$\sum_{i \in q} \frac{h\nu B_{ref} F_i}{T_i P_i} \leq OSNR_T \quad (3a)$$

$$\sum_{i \in q} \frac{\gamma_i}{\alpha_i} P_i (1 - T_i) \leq NL_T \quad (3b)$$

where $OSNR_T$ is the OSNR threshold, and $NL_T$ is the nonlinearity (e.g., nonlinear phase-shift) threshold. Eq. (3a) substantially states that a feasible path q provides sufficient OSNR to make the optical signal decodable at the end receiver. Eq. (3b) substantially states that a feasible path q does not cause a prohibitively large accumulation of nonlinear distortions in the optical signal.

Figure 3:
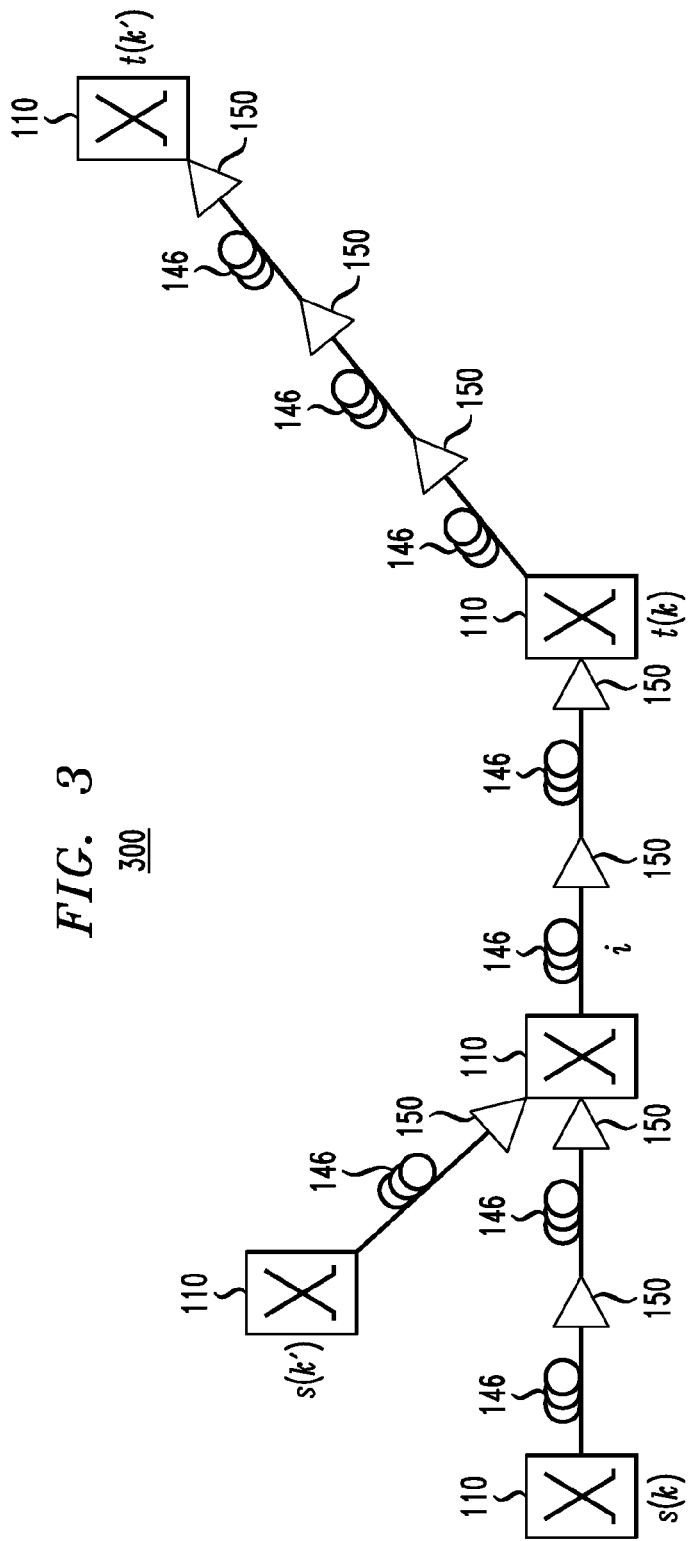
FIG. 3 shows a portion of the optical network of FIG. 1 configured to carry two different commodities according to an embodiment of the disclosure.

FIG. 3 shows a portion 300 of network 100 configured to carry two different commodities (labeled k and k') according to an embodiment of the disclosure. The path corresponding to commodity k originates at node s(k) and terminates at node t(k). The path corresponding to commodity k' originates at node s(k') and terminates at node t(k'). Both paths include span i. As a result, the launch power of span i affects signal characteristics of both commodities. This attribute of a shared span typically limits the range of power settings that may be used for a span analogous to span i, e.g., because for some power settings, the path corresponding to commodity k may be feasible while the path corresponding to commodity k' may not be feasible. For example, when the path corresponding to commodity k' is longer than the path corresponding to commodity k, it tends to cause a greater cumulative nonlinear phase shift at a particular power setting (see Eq. (3b)). On the other hand, if the power used for span i is lowered to reduce the nonlinear phase shift, then the path corresponding to commodity k may become infeasible due to not meeting the OSNR threshold (also see Eq. (3a)). This example illustrates the fact that the set of paths that can be used to route the various commodities in network 100 is a function of the power settings used in various optical amplifiers 150, or equivalently, the launch power at an individual fiber span is a function of the paths that traverse that span. It follows then that, for optimal results, the problems of setting the optical gains and selecting the routing paths for different commodities may need to be solved jointly or in interdependent manner.

FIG. 4 shows a flowchart of a signal-routing method 400 that can be used in network 100 (FIG. 1) according to an embodiment of the disclosure. In an example embodiment, method 400 is directed at (i) finding a set of paths in network 100 along which flows corresponding to different commodities can be routed in an efficient manner and (ii) determining and setting appropriate power levels P, for different corresponding spans i. The search is constrained to the paths that satisfy both Eq. (3a) and Eq. (3b).

In an example embodiment, method 400 can be executed by or at network controller 130. Based on the results of the executed method 400, network controller 130 can then use control paths 132 to appropriately configure nodes 110 and amplifiers 150. Method 400 may be re-executed as necessary when the traffic matrix changes and/or the span parameters indicated in FIG. 2 are altered for any of the fiber spans 146, e.g., due to a hardware reconfiguration, repair, or upgrade.

In an alternative embodiment, some of the processing of method 400 may be executed using a processor external to network controller 130, with the obtained results being stored in a memory (not explicitly shown in FIG. 1A) accessible to the network controller. In this embodiment, network controller 130 may be configured to retrieve an appropriate set of results from the memory instead of generating them dynamically and/or in situ. The memory may be pre-loaded with multiple sets of results, e.g., corresponding to different possible traffic matrices. Upon obtaining the traffic matrix that needs to be routed, network controller 130 may retrieve the set of results corresponding to that particular traffic matrix and, if necessary, execute the remaining portions of method 400 using an internal processor and/or other appropriate hardware resources hosted by or accessible to the network controller.

For illustration purposes and without undue limitation, the following description is given for an embodiment in which all processing of method 400 is performed at network controller 130.

As used herein the term "feasible path" refers to a path q corresponding to a commodity specified by the traffic matrix that satisfies the following condition:

$$\sum_{i \in q} \sqrt{a_i b_i} \leq \sqrt{\frac{NL_T}{OSNR_T}} \qquad (4)$$

where $a_i$ and $b_i$ are the span parameters defined by Eqs. (5a)-(5b):

$$a_i = \frac{h\nu B_{ref} F_i}{T_i} \qquad (5a)$$

$$b_i = \frac{\gamma_i (1 - T_i)}{\alpha_i} \qquad (5b)$$

The parameter $a_i$ can illustratively be interpreted as the contribution of span i to the noise power spectral density within the reference bandwidth. The parameter $b_i$ can illustratively be interpreted as the effective nonlinearity accumulation in span i per unit of signal power. Eq. (6) gives a mathematical definition of the set $\mathcal{F}$ of feasible paths:

$$\mathcal{F} = \left\{ q : \sum_{i \in q} \sqrt{a_i b_i} \leq \sqrt{\frac{NL_T}{OSNR_T}} \right\} \qquad (6)$$

At step 402 of method 400, controller 130 operates to obtain sets of parameters $a_i$ and $b_i$ for each span i in network 100. In one embodiment, controller 130 may be configured to calculate the parameters $a_i$ and $b_i$ using Eqs. (5a)-(5b). In an alternative embodiment, controller 130 may be configured to retrieve the sets of parameters $a_i$ and $b_i$ from a memory containing all necessary parameters of network 100 in an appropriately accessible form. A person of ordinary skill in the art will understand that the memory may be preloaded with all necessary parameters of network 100 prior to the execution of method 400, e.g., when the network is deployed, modified, upgraded, and/or tested.

At step 404 of method 400, controller 130 determines the universal set $\mathcal{P}$ of powers $P_i^*$ for various paths q corresponding to the traffic matrix. As used herein the term "universal power" refers to an optical launch power $P_i$ for span i that approximately (e.g., within ±10%) satisfies Eq. (7):

$$P_i^* \approx \sqrt{\frac{a_i}{b_i} OSNR_T NL_T} \qquad (7)$$

A useful property of the universal set $\mathcal{P}$ of powers $P_i^*$ is that setting the optical launch powers $P_i$ to $P_i^*$ (i.e., $P_i = P_i^*$) does not make any path q non-feasible due to the effects of inter-relatedness of the optical powers on the paths corresponding to different commodities that are explained above in reference to FIG. 3. A mathematical proof of this property can be found, e.g., in the above-cited U.S. Provisional Patent Application No. 62/106,419.

As is evident from Eq. (7), the determination of the universal set $\mathcal{P}$ of powers $P_i^*$ carried out at step 404 relies on the sets of parameters $a_i$ and $b_i$ obtained at step 402 and also on the thresholds $OSNR_T$ and $NL_T$. In some embodiments, the thresholds $OSNR_T$ and $NL_T$ may have fixed predetermined values. In some other embodiments, the values of thresholds $OSNR_T$ and $NL_T$ may themselves be adjustable parameters of the routing algorithm, in which case method 400 may be iteratively cycled through steps 404 and 406 until an appropriate iteration-stopping condition is satisfied.

At step 406 of method 400, controller 130 is configured to solve the problem of routing the traffic matrix through the set $\mathcal{F}$ of feasible paths q (see Eq. (6)) in network 100 in a manner that tends to approximately minimize (e.g., to within a predetermined tolerance) the resulting maximum link utilization in the network.

In an example embodiment, step 406 is directed at finding an approximate solution to the below-described mathematical problem.

The routing matrix gives the amounts of flow $d_k$ that need to be transmitted through network 100 for each commodity k. The maximum possible link utilization is one (or 100% of the link capacity). If the maximum link utilization required for routing a traffic matrix is smaller than one, then the traffic matrix is routable. Conversely, if the maximum required link utilization is greater than one, then the traffic matrix is not routable. An alternative formulation of these routability conditions may be based on scaling each entry in the traffic matrix by a factor θ. The problem to be solved then may be directed at finding the maximum value of the factor θ for which θ times the traffic matrix can still be routed. In this formulation, $\theta^{-1}$ represents the maximum link utilization when the traffic matrix is routed. If the maximum value of θ is greater than one, then the traffic matrix is routable. Otherwise, the traffic matrix is not routable.

The following linear program with a set of constraints can represent the problem of finding the maximum value of the factor θ:

$$\max \theta$$

$$\sum_{q \in Q_k \cap F} x_q = \theta d_k, \forall k \qquad (8a)$$

$$\sum_k \sum_{e \in q \in Q_k \cap F} x_q \leq c_e, \forall e \qquad (8b)$$

$$x_q \geq 0, \forall q \qquad (8c)$$

where $x_q$ denotes the flow volume on path q; $Q_k$ denotes the set of paths available for commodity k in network 100; $c_e$ is the data rate for link e; and $d_k$ is the flow volume for commodity k. Constraints (8a) ensure that the flows are routed only along the paths from the set $\mathcal{F}$ (also see Eq. (6)). Constraints (8b) ensure that the routed flows do not exceed the corresponding link capacities. Note that all routing for commodity k takes place at the intersection of $Q_k$ and the set $\mathcal{F}$ (i.e. at $Q_k \cap \mathcal{F}$).

In an example embodiment, the above-formulated linear program can be implemented and solved, e.g., as further described below in reference to FIG. 5. In alternative embodiments, other suitable algorithmic implementations are also possible.

Upon being executed by controller 130, step 406 identifies an approximately optimal subset of paths q from the set $\mathcal{F}$ and provides the corresponding flow volumes $x_q$ to be sent along each of these paths to carry the traffic corresponding to the traffic matrix.

At step 408 of method 400, controller 130 uses control paths 132 to appropriately configure nodes 110 and amplifiers 150. More specifically, nodes 110 are configured to direct the various flows corresponding to the traffic matrix along the subset of paths identified at step 406. Amplifiers 150 are configured to generate the optical launch powers on the various fiber spans of these paths such that these optical launch powers are approximately set to the levels of the respective powers $P_i^*$ determined at step 404.

Figure 5A:
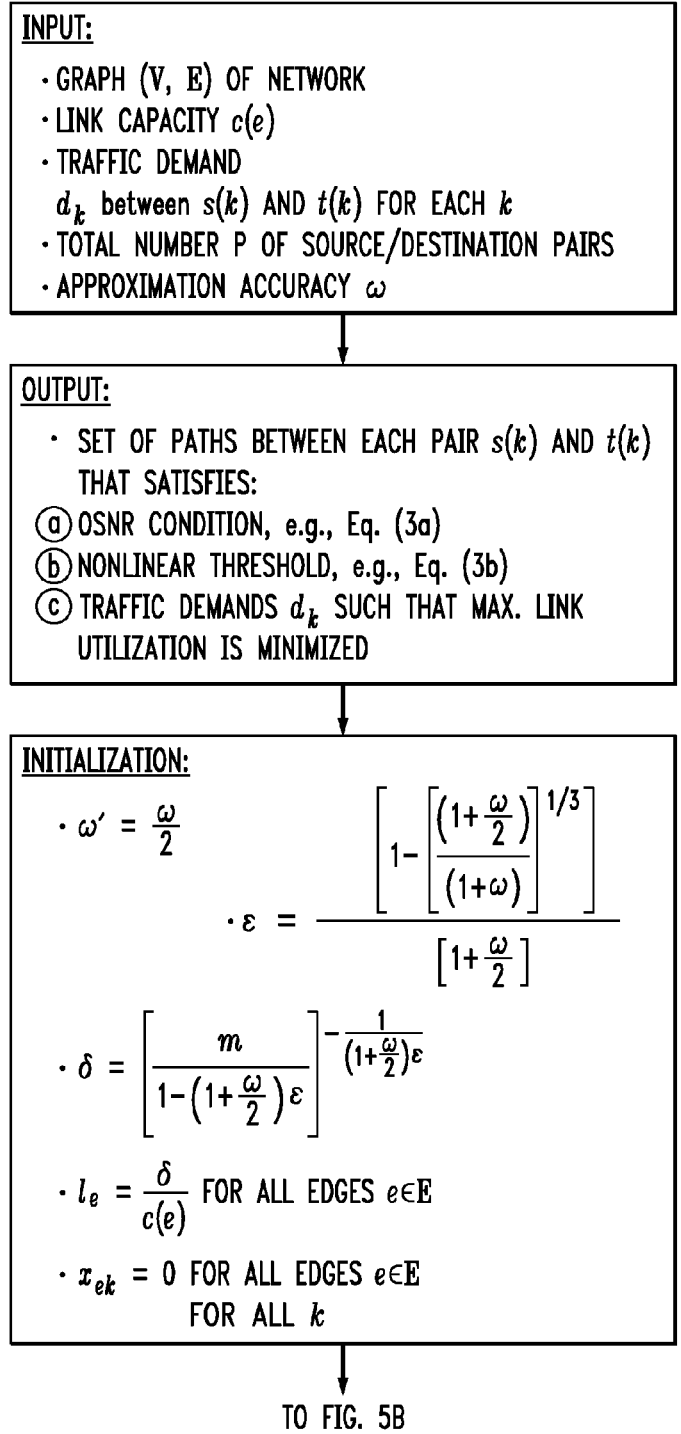
FIGS. 5A-5B show a pseudo-code that can be used to implement the signal-routing method of FIG. 4 according to an embodiment of the disclosure.
Figure 5B:
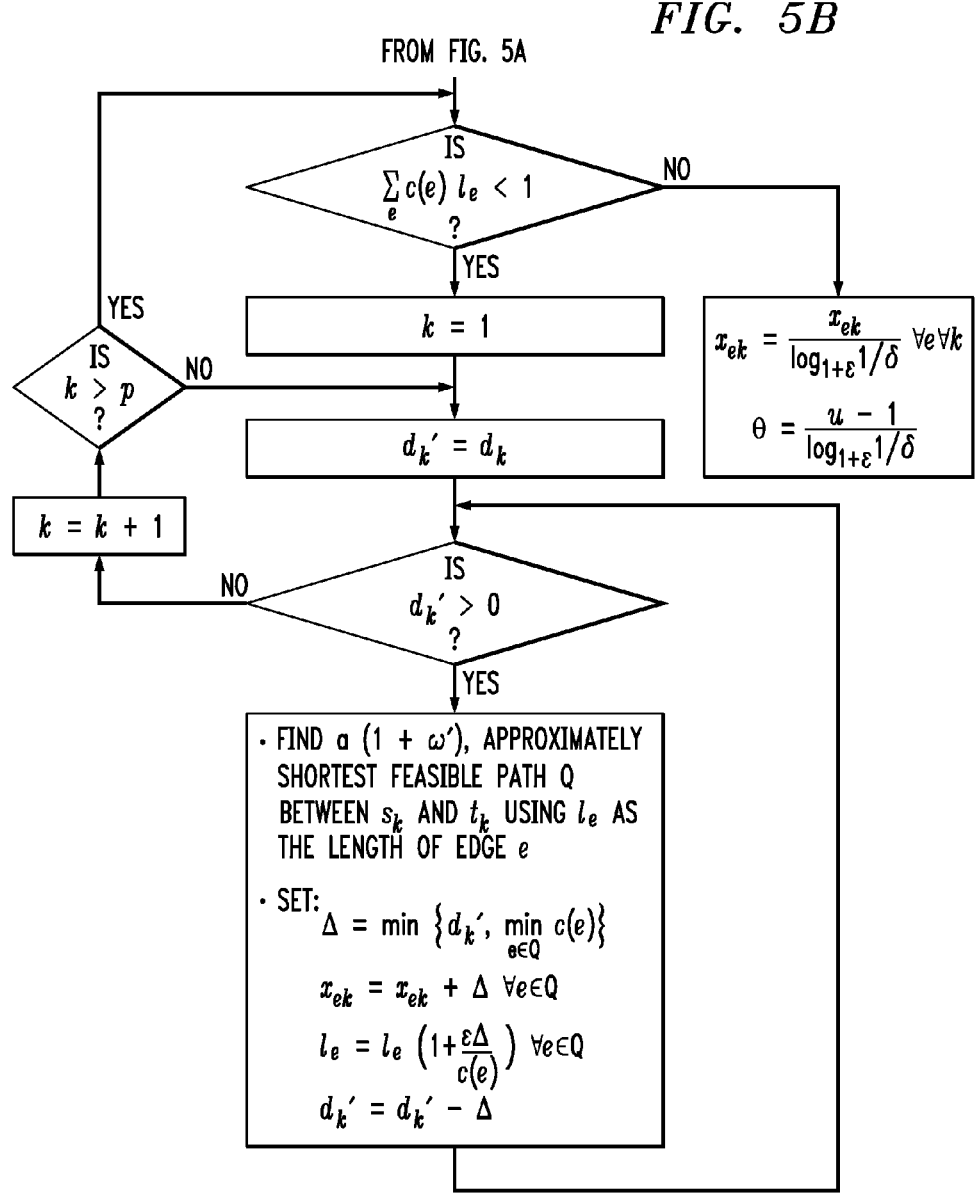

FIGS. 5A-5B show a pseudo-code 500 that can be used to implement step 406 of method 400 (FIG. 4) according to an embodiment of the disclosure. More specifically, pseudo-code 500 realizes a fully polynomial-time approximation scheme (FPTAS) for the linear program formulated above in reference to Eqs. (8a)-(8c). An FPTAS for a maximization problem, such as that of step 406 of method 400, is capable of providing an approximate solution that is within a factor of $(1-\omega)$ of the true optimum solution for any specified tolerance $\omega$. The required time for finding this approximate solution is polynomial in the number of problem parameters and $1/\omega$.

The FPTAS corresponding to FIGS. 5A-5B is a primal-dual algorithm, and one can write the dual to the problem of step 406 of method 400 as follows. The dual variables are denoted $l_e$ and $z_k$. The dual variables $l_e$ are associated with the constraints of Eq. (9):

$$\sum_{q:e \in q} x_q \leq c_e, \forall e \quad (9)$$

The dual variables $z_k$ are associated with the constraints of Eq. (10):

$$\sum_{q \in Q_k} x_q = d_k, \forall k \quad (10)$$

These constraints ensure that the span capacities are not exceeded and that the flow volume allocated for commodity k is sufficient for the demand specified by the traffic matrix. The dual problem to be solved can then be formulated using Eqs. (11a)-(11d) as follows:

$$\min \eta(L) = \sum_e c_e l_e \quad (11a)$$

$$\sum_{e \in q} l_e \geq z_k, \forall k \forall q \in Q_k \cap \mathcal{F} \quad (11b)$$

$$\sum_k d_k z_k \geq 1 \quad (11c)$$

$$l_e, z_k \geq 0, \forall e \forall k \quad (11d)$$

Let $$\phi(L) \triangleq \sum_k d_k \mu_k(L)$$

denote the sum of the products of traffic volumes and shortest path lengths for each commodity. Then, the dual problem formulated by Eqs. (11a)-(11d) can also be interpreted as being directed at finding:

$$\min \sigma = \frac{\eta(L)}{\phi(L)} \quad (12)$$

Let $\sigma^*$ denote the value of the minimum defined by Eq. (12). One can scale the traffic demands and link capacities such that $\sigma^* \geq 1$.

The algorithm defined by pseudo-code 500 starts out by setting the initial values of dual variables $l_e$ in accordance with Eq. (13):

$$l_e = \frac{\delta}{c_e} \quad (13)$$

where $\delta$ is a predetermined constant (also see FIG. 5A). The value of $l_e$ can be interpreted as the length of link e. The algorithm then attempts to simulate sending the flow for each commodity k, in turn, along the respective shortest feasible path. The problem of determining the shortest feasible path is NP-complete, but permits the use of an efficient approximation algorithm. Once the flow is sent, the dual lengths of all the links on the shortest feasible path are incremented as indicated in pseudo-code 500 (see FIG. 5B). The process of sending the flows and adjusting the dual lengths is repeated iteratively until a termination condition is met. A mathematical proof that the algorithm defined by pseudo-code 500 solves the above-formulated dual problem can be found, e.g., in the above-cited U.S. Provisional Patent Application No. 62/106,419.

With a careful choice of the values of $\omega'$, $\epsilon$, and $\delta$ for the algorithm defined by pseudo-code 500, the total number of phases can be bounded by $N_p = \tilde{O}(\omega^{-2})$. The total number of iterations is approximately $N_i = \tilde{O}(\omega^{-2}D)$. The total number of steps is approximately $N_s = \tilde{O}(\omega^{-2}(D+E))$. In various steps of the algorithm, a constrained shortest path computation and other updates indicated in FIG. 5 are performed.

Various embodiments disclosed above are primarily designed for transparent optical networks, in which a candidate path is feasible if and only if the above-discussed path constraints are satisfied from end-to-end. However, in some networks, the use of end-to-end constraints may lead to a routing failure, e.g., because the corresponding network simply does not have or cannot support a sufficient number of routes that satisfy such constraints. This routing failure can be remedied, e.g., by converting an optically transparent network into an optically translucent one, wherein a relatively small number (compared to the number of nodes) of signal regenerators are used to absorb the dispersed optical signals, reconstruct original signals in the electrical domain, and convert the reconstructed signals back into optical signals. In this manner, the range of optical transmission can be greatly extended, and more of feasible candidate paths can be considered and utilized during the routing processing. As a downside, this network conversion requires a relatively large capital expenditure for deploying and operating optical-to-electrical-to-optical (OEO) signal regenerators.

The algorithm defined by pseudo-code 500 can be modified, e.g., as further described below, for use in translucent optical networks. To enable a person of ordinary skill in the art to make and use these modifications, we first explain how OEO signal regenerators and their capacities can be represented in the graph G used in pseudo-code 500. It is assumed that each of the OEO signal regenerators is attached to some node 110. Locations of the nodes 110 equipped with OEO signal regenerators are known a priori and supplied to the modified pseudo-code as an additional input in the section labeled "Input" (see FIG. 5A). In practice, only a small fraction of nodes 110 are equipped with OEO signal regenerators and, in some embodiments, said OEO signal regenerators are capable of regenerating only a limited number of channels $c_v^\tau$.

Figure 6:
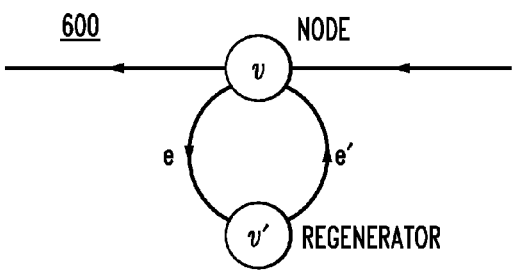
FIG. 6 shows a graph abstraction that can be used to modify the pseudo-code shown in FIGS. 5A-5B according to an embodiment of the disclosure.

FIG. 6 shows a graph 600 that can be used to modify pseudo-code 500 (FIGS. 5A-5B) according to an embodiment of the disclosure. We assume that the OEO signal regenerator (denoted by the symbol $v'$) is attached at a certain node 110 (denoted by the symbol $v$) and is configured to be inserted into flows that pass through the node on-demand, rather than by fixed (always ON) allocation. As such, the OEO signal regenerator is represented in graph 600 using a loop composed of two links $e=v \rightarrow v'$ and $e'=v' \rightarrow v$. The corresponding link capacity is $c_e = c_{e'} = c_v^\tau$.

In a modified pseudo-code 500, all OEO signal regenerators configured as indicated in FIG. 6 are grouped into a set $V_r$, and the corresponding links e and e' are added to the link set E. When an optical signal arrives at node $v$, it may either be applied directly for the next fiber span or enter the loop cc' to be regenerated in OEO signal regenerator v'. Only some flows are directed through the regenerator loops, and the corresponding capacity restrictions can be added to pseudo-code 500 in a relatively straightforward manner.

As a next modification of pseudo-code 500, one can adapt Hassin's constrained shortest path algorithm to support the added regenerator functionality. This algorithm is disclosed, e.g., in R. Hassin, "Approximation schemes for the restricted shortest path problem," Mathematics of Operation Research, 17(1):36-42, 1992, which is incorporated herein by reference in its entirety. Hassin's algorithm follows a dynamic programming approach: it starts from the source node s(k), then iteratively increases the search range l and updates the minimum cumulative dispersion $$g_v \triangleq \sum_{i \in p_v} \sqrt{a_i b_i}$$

along the least dispersed paths $p_v$ from s(k) to every other node $v$ within the search range $|p_v|<l$, and terminates as soon as it finds a path $p_{t(k)}$ from s(k) to t(k) that satisfies the dispersion constraint $$g_{t(k)} \leq \sqrt{\frac{NL_T}{OSNR_T}}.$$

The resulting path $p_{t(k)}$ is the constrained shortest path.

The following equations mathematically describe the above-indicated modifications of pseudo-code 500.

$$g_{s(k)}=0, l=0,1,2,\ldots,|p_{t(k)}| \tag{14a}$$

$$g_v(l)=\infty, \forall v \in V - s(k), l=0,1,2,\ldots,|p_{t(k)}| \tag{14b}$$

$$g_v(l) = \min\left\{g_v(l-1), \min_{e=v'v}\left(g_{v'}(l-l_e) + \sum_{i \in e} \sqrt{a_i b_i}\right)\right\}, \tag{14c}$$

$$\forall v \in V - s(k), l = 0, 1, 2, \ldots, |p_{t(k)}|$$

where Eqs. (14a) and (14b) provide the initial conditions of the search, and Eq. (14c) gives an iterative update. The use of OEO signal regenerators causes the cumulative dispersion to reset to zero at each of the regenerator nodes from set $V_r$, as reflected in Eqs. (15a)-(15d):

$$g_{s(k)}=0, l=0,1,2,\ldots,|p_{t(k)}| \tag{15a}$$

$$g_v(l)=\infty, \forall v \in V \cup V_r - s(k), l=0,1,2,\ldots,|p_{t(k)}| \tag{15b}$$

$$g_v(l) = \min\left\{g_v(l-1), \min_{e=v'v}\left(g_{v'}(l-l_e) + \sum_{i \in e} \sqrt{a_i b_i}\right)\right\}, \tag{15c}$$

$$\forall v \in V - s(k), l = 0, 1, 2, \ldots, |p_{t(k)}|$$

$$g_v = 0, \text{ if } \min_{e=v'v}\left(g_{v'}(l-l_e) + \sum_{i \in e} \sqrt{a_i b_i}\right) \leq \sqrt{\frac{NL_T}{OSNR_T}}, \tag{15d}$$

$$\forall v \in V_r, l = 0, 1, 2, \ldots, |p_{t(k)}|$$

In this manner, an OEO signal regenerator $v' \in V_r$ is activated as soon as a feasible path from s(k) to $v$ that conforms to the cumulative nonlinearity constraint is found, and starts serving as a reset point for all candidate paths passing through it. Consequently, the scope of the constrained shortest path is no longer restricted to candidate paths without regenerators. Such an extension of the scope does not mean that any paths can utilize OEO signal regenerators. Instead, the above-indicated limited capacities of the OEO signal regenerators need to be efficiently allocated to those traffic demands that could not be routed without OEO signal regenerators or would highly benefit from the use of OEO signal regenerators. This can be achieved through iterative adjustments of the length system L and reallocation of traffic flows, e.g., as indicated in pseudo-code 500.

According to an example embodiment disclosed above in reference to FIGS. 1-6, provided is an optical communication method (e.g., 400, FIG. 4) comprising the steps of: determining (e.g., 402+404+406, FIG. 4) a plurality of optical paths for a traffic matrix to be routed through an optical network (e.g., 100, FIG. 1), wherein each optical path of the plurality satisfies a feasibility condition defined by a first threshold value and a second threshold value, the first threshold value being configured to specify an optical signal-to-noise ratio, and the second threshold value being configured to specify a nonlinear phase shift; determining (e.g., 404, FIG. 4) a universal set of powers, each power in said set corresponding to a respective span (e.g., 146, FIG. 1B) in the plurality of optical paths and representing an optical power level in that respective span, with each power in said set being determined based on the first and second threshold values; and routing (e.g., 406, FIG. 4) the traffic matrix through a subset of the plurality of optical paths.

In some embodiments of the above method, the method further comprises the step of configuring (e.g., as part of 408, FIG. 4) network nodes (e.g., 110, FIG. 1A) located on optical paths of the subset to direct optical signals configured to carry traffic flows corresponding to the traffic matrix along respective optical paths of the subset.

In some embodiments of any of the above methods, the method further comprises the step of configuring (e.g., as another part of 408, FIG. 4) optical amplifiers (e.g., 150, FIG. 1B) located on the optical paths of the subset to amplify the optical signals in a manner that causes an optical launch power for each respective span in the subset to approximate (e.g., to within ±10%) a respective power from the universal set of powers.

In some embodiments of any of the above methods, each of the optical nodes located on the optical paths of the subset comprises a respective reconfigurable optical add/drop multiplexer (e.g., as 110$_1$, FIG. 1A).

In some embodiments of any of the above methods, the optical nodes located on the optical paths of the subset include one or more optical nodes equipped with respective OEO signal regenerators (e.g., as indicated in FIG. 6).

In some embodiments of any of the above methods, at least one of the optical signals is WDM signal.

In some embodiments of any of the above methods, optical paths allocated to carry traffic flows corresponding to the traffic matrix do not have an optical path not belonging to the plurality of optical paths that satisfy the feasibility condition.

In some embodiments of any of the above methods, the optical network is a transparent optical network.

In some embodiments of any of the above methods, the optical network is a translucent optical network.

In some embodiments of any of the above methods, the feasibility condition is given by the following inequality:

$$\sum_{i \in q} \sqrt{a_i b_i} \leq \sqrt{\frac{NL_T}{OSNR_T}}$$

where $$a_i = \frac{hvB_{ref}F_i}{T_i}; b_i = \frac{\gamma_i(1-T_i)}{\alpha_i};$$

i denotes a span; q denotes an optical path; $OSNR_T$ is the first threshold; $NL_T$ is the second threshold; hv is an energy of one photon of optical frequency v; $B_{ref}$ is a reference bandwidth; $F_i$ is a noise figure for the span; $\alpha_i$ is a fiber loss coefficient for the span; $T_i$ is optical transmittance of the span; and $\gamma_i$ is a nonlinear coefficient for the span.

In some embodiments of any of the above methods, each power in the universal set of powers is determined in accordance with the following equation:

$$P_i^* \approx \sqrt{\frac{a_i}{b_i} OSNR_T NL_T}$$

where $$a_i = \frac{hvB_{ref}F_i}{T_i}; b_i = \frac{\gamma_i(1-T_i)}{\alpha_i};$$

i denotes a span; $OSNR_T$ is the first threshold; $NL_T$ is the second threshold; hv is an energy of one photon of optical frequency v; $B_{ref}$ is a reference bandwidth; $F_i$ is a noise figure for the span; $\alpha_i$ is a fiber loss coefficient for the span; $T_i$ is optical transmittance of the span; and $\gamma_i$ is a nonlinear coefficient for the span.

In some embodiments of any of the above methods, the method is executed at a controller (e.g., 130, FIG. 1A) of the optical network.

In some embodiments of any of the above methods, for an optical path, the feasibility condition is checked by: obtaining (e.g., 402, FIG. 4; Eqs. (4)-(5)) a respective span metric for each span of the optical path; summing (e.g., as in the left side of Eq. (4)) the respective span metrics to generate an aggregated metric for the optical path; and comparing the aggregated metric with a reference metric defined by the first and second threshold values (e.g., as indicated by Eq. (4)).

In some embodiments of any of the above methods, the method further comprises the steps of: generating a plurality of routing solutions by specifying a plurality of different traffic matrices and repeating the steps of determining the plurality of optical paths, determining the universal set of powers, and routing for each said different traffic matrices; and storing the plurality of routing solutions in a non-volatile memory.

In some embodiments of any of the above methods, the method further comprises the steps of: obtaining a current traffic matrix to be routed through the optical network; and retrieving from the non-volatile memory one of the plurality of routing solutions corresponding to the current traffic matrix.

In some embodiments of any of the above methods, the method further comprises the steps of: configuring (e.g., as part of 408, FIG. 4) network nodes (e.g., 110, FIG. 1A) to direct optical signals configured to carry traffic flows corresponding to the current traffic matrix along respective optical paths specified in said one of the plurality of routing solutions; and configuring (e.g., as another part of 408, FIG. 4) optical amplifiers (e.g., 150, FIG. 1B) located on the respective optical paths to amplify the optical signals in a manner that causes an optical launch power for each respective span to approximate (e.g., to within ±10%) a respective power from the universal set of powers corresponding to said one of the plurality of routing solutions.

In some embodiments of any of the above methods, the routing is performed using a fully polynomial-time approximation scheme (e.g., 500, FIG. 5).

According to another example embodiment disclosed above in reference to FIGS. 1-6, provided is a non-transitory machine-readable medium, having encoded thereon program code, wherein, when the program code is executed by a machine, the machine implements a computer-aided signal-routing method, the computer-aided signal-routing method comprising the steps of: determining (e.g., 402+404+406, FIG. 4) a plurality of optical paths for a traffic matrix to be routed through an optical network (e.g., 100, FIG. 1), wherein each optical path of the plurality satisfies a feasibility condition defined by a first threshold value and a second threshold value, the first threshold value being configured to specify an optical signal-to-noise ratio, and the second threshold value being configured to specify a nonlinear phase shift; determining (e.g., 404, FIG. 4) a universal set of powers, each power in said set corresponding to a respective span (e.g., 146, FIG. 1B) in the plurality of optical paths and representing an optical power level in that respective span, with each power in said set being determined based on the first and second threshold values; and routing (e.g., 406, FIG. 4) the traffic matrix through a subset of the plurality of optical paths.

In some embodiments of the above non-transitory machine-readable medium, the computer-aided signal-routing method further comprises the steps of: generating a plurality of routing solutions by specifying a plurality of different traffic matrices and repeating the steps of determining the plurality of optical paths, determining the universal set of powers, and routing for each of said different traffic matrices; and storing the plurality of routing solutions in a non-volatile memory.

In some embodiments of any of the above non-transitory machine-readable media, the computer-aided signal-routing method further comprises the steps of: obtaining a current traffic matrix to be routed through the optical network; and retrieving from the non-volatile memory one of the plurality of routing solutions corresponding to the current traffic matrix.

According to yet another example embodiment disclosed above in reference to FIGS. 1-6, provided is an optical network (e.g., 100, FIG. 1A) comprising: a plurality of network nodes (e.g., 110, FIG. 1A) optically interconnected by a plurality of optical links (e.g., 140, FIG. 1A), each comprising one or more fiber spans (e.g., 146, FIG. 1B); and a network controller (e.g., 140, FIG. 1A) operatively coupled to the plurality of network nodes and configured to: determine (e.g., 402+404+406, FIG. 4) a plurality of optical paths for a traffic matrix to be routed through the plurality of optical links, wherein each optical path of the plurality of optical paths satisfies a feasibility condition defined by a first threshold value and a second threshold value, the first threshold value being configured to specify an optical signal-to-noise ratio, and the second threshold value being configured to specify a nonlinear phase shift; determine (e.g., 404, FIG. 4) a universal set of powers, each power in said set corresponding to a respective span (e.g., 146, FIG. 1B) in the plurality of optical paths and representing an optical power level in that respective span, with each power in said set being determined based on the first and second threshold values; and route (e.g., 406, FIG. 4) the traffic matrix through a subset of the plurality of optical paths.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The functions of the various elements shown in the figures, including any functional blocks labeled as "controllers" and "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An optical communication method comprising:
    determining a plurality of optical paths for a traffic matrix to be routed through an optical network, wherein each optical path of the plurality satisfies a feasibility condition defined by a first threshold value and a second threshold value, the first threshold value being configured to specify an optical signal-to-noise ratio, and the second threshold value being configured to specify an optical nonlinearity threshold;
    determining a universal set of powers, each power in said set corresponding to a respective span in the plurality of optical paths and representing an optical power level in that respective span, with each power in said set being determined based on the first and second threshold values; and
    routing the traffic matrix through a subset of the plurality of optical paths.

2. The method of claim 1, further comprising configuring network nodes located on optical paths of the subset to direct optical signals configured to carry traffic flows corresponding to the traffic matrix along respective optical paths of the subset.

3. The method of claim 2, further comprising configuring optical amplifiers located on the optical paths of the subset to amplify the optical signals in a manner that causes an optical launch power for each respective span in the subset to approximate a respective power from the universal set of powers.

4. The method of claim 2, wherein each of the optical nodes located on the optical paths of the subset comprises a respective reconfigurable optical add/drop multiplexer.

5. The method of claim 2, wherein the optical nodes located on the optical paths of the subset include one or more optical nodes equipped with respective OEO signal regenerators.

6. The method of claim 2, wherein at least one of the optical signals is WDM signal.

7. The method of claim 1, wherein optical paths allocated to carry traffic flows corresponding to the traffic matrix do not have an optical path not belonging to the plurality of optical paths that satisfy the feasibility condition.

8. The method of claim 1, wherein the optical network is a transparent optical network.

9. The method of claim 1, wherein the optical network is a translucent optical network.

10. The method of claim 1, wherein the feasibility condition is given by the following inequality:

$$\sum_{i \in q} \sqrt{a_i b_i} \leq \sqrt{\frac{NL_T}{OSNR_T}}$$

where $$a_i = \frac{h v B_{ref} F_i}{T_i}; b_i = \frac{\gamma_i (1 - T_i)}{\alpha_i};$$

i denotes a span; q denotes an optical path; $OSNR_T$ is the first threshold value; $NL_T$ is the second threshold value; hv is an energy of one photon of optical frequency v; $B_{ref}$ is a reference bandwidth; $F_i$ is a noise figure for the span; $a_i$ is a fiber loss coefficient for the span; $T_i$ is optical transmittance of the span; and $\gamma_i$ is a nonlinear coefficient for the span.

11. The method of claim 1, wherein each power in the universal set of powers is determined in accordance with the following equation:

$$P_i^* \approx \sqrt{\frac{a_i}{b_i} OSNR_T NL_T}$$

where $$a_i = \frac{h v B_{ref} F_i}{T_i}; b_i = \frac{\gamma_i (1 - T_i)}{\alpha_i};$$

i denotes a span; $OSNR_T$ is the first threshold value; $NL_T$ is the second threshold value; hv is an energy of one photon of optical frequency v; $B_{ref}$ is a reference bandwidth; $F_i$ is a noise figure for the span; $\alpha_i$ is a fiber loss coefficient for the span; $T_i$ is optical transmittance of the span; and $\gamma_i$ is a nonlinear coefficient for the span.

12. The method of claim 1, wherein, for an optical path, the feasibility condition is checked by:
    obtaining a respective span metric for each span of the optical path;
    summing the respective span metrics to generate an aggregated metric for the optical path; and
    comparing the aggregated metric with a reference metric defined by the first and second threshold values.

13. The method of claim 1, further comprising:
    generating a plurality of routing solutions by specifying a plurality of different traffic matrices and repeating the steps of determining the plurality of optical paths, determining the universal set of powers, and routing for each of said different traffic matrices; and
    storing the plurality of routing solutions in a non-volatile memory.

14. The method of claim 13, further comprising:
    obtaining a current traffic matrix to be routed through the optical network; and
    retrieving from the non-volatile memory one of the plurality of routing solutions corresponding to the current traffic matrix.

15. The method of claim 14, further comprising:
configuring network nodes to direct optical signals configured to carry traffic flows corresponding to the current traffic matrix along respective optical paths specified in said one of the plurality of routing solutions; and
configuring optical amplifiers located on the respective optical paths to amplify the optical signals in a manner that causes an optical launch power for each respective span to approximate a respective power from the universal set of powers corresponding to said one of the plurality of routing solutions.

16. The method of claim 1, wherein the routing is performed using a fully polynomial-time approximation scheme.

17. A non-transitory machine-readable medium, having encoded thereon program code, wherein, when the program code is executed by a machine, the machine implements a computer-aided signal-routing method, the computer-aided signal-routing method comprising:
determining a plurality of optical paths for a traffic matrix to be routed through an optical network, wherein each optical path of the plurality satisfies a feasibility condition defined by a first threshold value and a second threshold value, the first threshold value being configured to specify an optical signal-to-noise ratio, and the second threshold value being configured to specify an optical nonlinearity threshold;
determining a universal set of powers, each power in said set corresponding to a respective span in the plurality of optical paths and representing an optical power level in that respective span, with each power in said set being determined based on the first and second threshold values; and
routing the traffic matrix through a subset of the plurality of optical paths.

18. The non-transitory machine-readable medium of claim 17, wherein the computer-aided signal-routing method further comprises:
generating a plurality of routing solutions by specifying a plurality of different traffic matrices and repeating the steps of determining the plurality of optical paths, determining the universal set of powers, and routing for each of said different traffic matrices; and
storing the plurality of routing solutions in a non-volatile memory.

19. The non-transitory machine-readable medium of claim 18, wherein the computer-aided signal-routing method further comprises:
obtaining a current traffic matrix to be routed through the optical network; and
retrieving from the non-volatile memory one of the plurality of routing solutions corresponding to the current traffic matrix.

20. An optical network comprising:
a plurality of network nodes optically interconnected by a plurality of optical links, each comprising one or more fiber spans; and
a network controller operatively coupled to the plurality of network nodes and configured to:
determine a plurality of optical paths for a traffic matrix to be routed through the plurality of optical links, wherein each optical path of the plurality of optical paths satisfies a feasibility condition defined by a first threshold value and a second threshold value, the first threshold value being configured to specify an optical signal-to-noise ratio, and the second threshold value being configured to specify an optical nonlinearity threshold;
determine a universal set of powers, each power in said set corresponding to a respective span in the plurality of optical paths and representing an optical power level in that respective span, with each power in said set being determined based on the first and second threshold values; and
route the traffic matrix through a subset of the plurality of optical paths.

* * * * *